US012589419B2

(12) United States Patent
Toyoshima et al.

(10) Patent No.: US 12,589,419 B2
(45) Date of Patent: Mar. 31, 2026

(54) MOBILE OBJECT AND METHOD FOR PREVENTING FOREIGN MATTER FROM ADHERING TO MOBILE OBJECT

(71) Applicant: TOYOTA JIDOSHA KABUSHIKI KAISHA, Toyota (JP)

(72) Inventors: Satoshi Toyoshima, Okazaki (JP); Shiro Oda, Anjo (JP); Takeshi Matsui, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 23 days.

(21) Appl. No.: 18/598,035

(22) Filed: Mar. 7, 2024

(65) Prior Publication Data

US 2024/0342773 A1     Oct. 17, 2024

(30) Foreign Application Priority Data

Apr. 17, 2023     (JP) ................................ 2023-067122

(51) Int. Cl.
| | |
|---|---|
| *B08B 17/00* | (2006.01) |
| *A47L 7/04* | (2006.01) |
| *A47L 9/28* | (2006.01) |
| *B08B 17/02* | (2006.01) |
| *G05D 1/242* | (2024.01) |
| *G05D 1/80* | (2024.01) |
| *G05D 105/10* | (2024.01) |

(52) U.S. Cl.
CPC ................ *B08B 17/02* (2013.01); *A47L 7/04* (2013.01); *A47L 9/2826* (2013.01); *A47L 9/2852* (2013.01); *G05D 1/242* (2024.01); *G05D 1/80* (2024.01); *A47L 2201/04* (2013.01); *G05D 2105/10* (2024.01)

(58) Field of Classification Search
CPC .......... B08B 17/02; A47L 7/04; A47L 9/2826; A47L 9/2852; A47L 2201/04; G05D 1/242; G05D 1/80; G05D 2105/10; B60S 1/54; B60S 1/566
See application file for complete search history.

(56) References Cited

U.S. PATENT DOCUMENTS

| | | | |
|---|---|---|---|
| 10,928,225 | B1 | 2/2021 | Krishnan et al. |
| 2015/0236640 | A1* | 8/2015 | Miyake ............... A47L 11/4041 |
| | | | 15/383 |
| 2022/0267102 | A1 | 8/2022 | Ishida |

FOREIGN PATENT DOCUMENTS

| | | | | | |
|---|---|---|---|---|---|
| CN | 113119160 A | * | 7/2021 | .............. | B25J 13/08 |
| CN | 113925398 A | * | 1/2022 | .......... | A47L 11/4072 |
| JP | 2005-217119 A | | 8/2005 | | |
| JP | 2011-194361 A | | 10/2011 | | |
| JP | 2020068895 A | * | 5/2020 | | |
| JP | 2022-127886 A | | 9/2022 | | |

(Continued)

OTHER PUBLICATIONS

Machine translation Kato 2020.*

*Primary Examiner* — Jelani A Smith
(74) *Attorney, Agent, or Firm* — Oliff PLC

(57) ABSTRACT

A mobile object is configured to move autonomously. The mobile object includes a sending out unit configured to send out air within the mobile object, a flow path configured to allow the air sent out by the sending out unit to flow, and a sensor configured to detect information around the mobile object, and disposed forward in a blowing out direction of the air blown out from the flow path.

5 Claims, 6 Drawing Sheets

(56)       References Cited

FOREIGN PATENT DOCUMENTS

| | | | |
|---|---|---|---|
| WO | 2005/072904 | A1 | 8/2005 |
| WO | 2014/103290 | A1 | 7/2014 |

* cited by examiner

8

EXHAUST
HEAT FAN DEVICE

BLOWING OUT DIRECTION

UPWARD

412

DISTANCE
SENSOR

DETECTION
DIRECTION

411

41

FORWARD

411

FORWARD     SENSOR SURFACE     θ     41

FLOW OF AIR

MOBILE OBJECT AND METHOD FOR PREVENTING FOREIGN MATTER FROM ADHERING TO MOBILE OBJECT

CROSS-REFERENCE TO RELATED APPLICATION

This application claims priority to Japanese Patent Application No. 2023-067122 filed on Apr. 17, 2023, incorporated herein by reference in its entirety.

BACKGROUND

1. Technical Field

The present disclosure relates to a mobile object that moves autonomously and a method for preventing foreign matter from adhering to the mobile object.

2. Description of Related Art

A mobile object that includes an optical distance sensor to detect distance information and that moves autonomously is known (see, for example, Japanese Unexamined Patent Application Publication No. 2022-127886 (JP 2022-127886 A)).

SUMMARY

However, in the mobile object, there is a possibility that foreign matter adheres to a sensor such as the distance sensor.

The present disclosure provides a mobile object that can suppress foreign matter from adhering to a sensor, and a method for preventing the foreign matter from adhering to the mobile object.

The mobile object according to a first aspect of the present disclosure is configured to move autonomously. The mobile object includes a sending out unit configured to send out air within the mobile object, a flow path configured to allow the air sent out by the sending out unit to flow, and a sensor configured to detect information around the mobile object and disposed forward in a blowing out direction of the air blown out from the flow path.

In the mobile object according to the first aspect of the present disclosure, the sending out unit may be an exhaust heat fan device configured to send out air including exhaust heat from the mobile object.

In the mobile object according to the first aspect of the present disclosure, the sensor may include a curved surface portion on a sensor surface or on a portion connected to the sensor surface.

In the mobile object according to the first aspect of the present disclosure, the mobile object may be a robot vacuum cleaner configured to autonomously move and perform cleaning. The sending out unit may be a suction device configured to perform the cleaning.

In the mobile object according to the first aspect of the present disclosure, the air may be blown out from above in a vertical direction of the mobile object, from behind in a longitudinal direction of the mobile object, or from a side in the longitudinal direction of the mobile object, with respect to the sensor.

In a method according to a second aspect of the present disclosure, the mobile object includes a sensor configured to detect information around the mobile object, a sending out unit configured to send out air within the mobile object, and a flow path configured to allow the air sent out by the sending out unit to flow, and the mobile object is configured to move autonomously based on distance information detected by the sensor. The method includes blowing the air onto the sensor from an outlet of the flow path.

The present disclosure can provide a mobile object that can suppress foreign matter from adhering to a sensor, and a method for preventing foreign matter from adhering to the mobile object.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
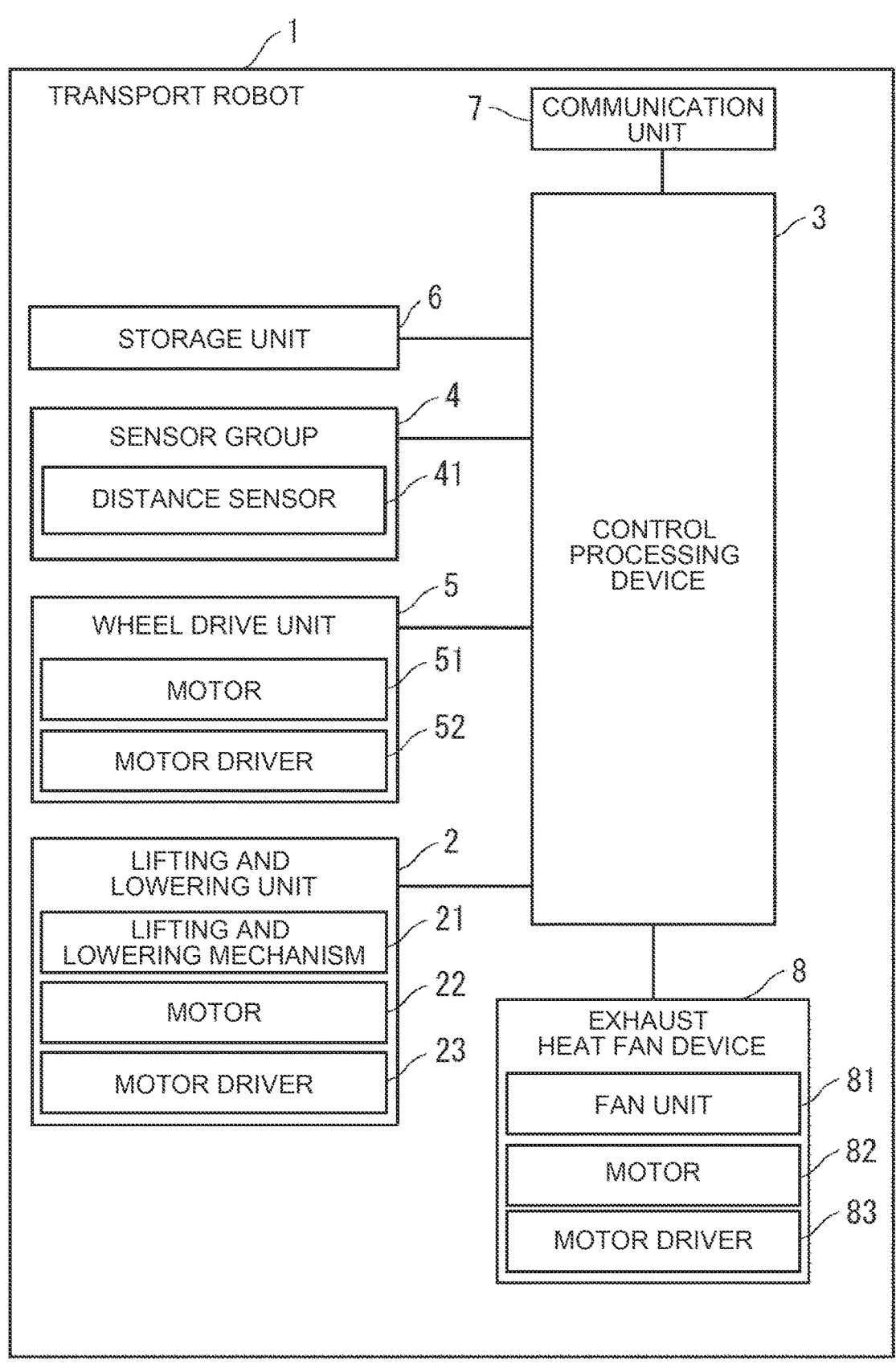
FIG. 1 is a block diagram showing a schematic system configuration of a mobile object according to the present embodiment.
Figure 2:
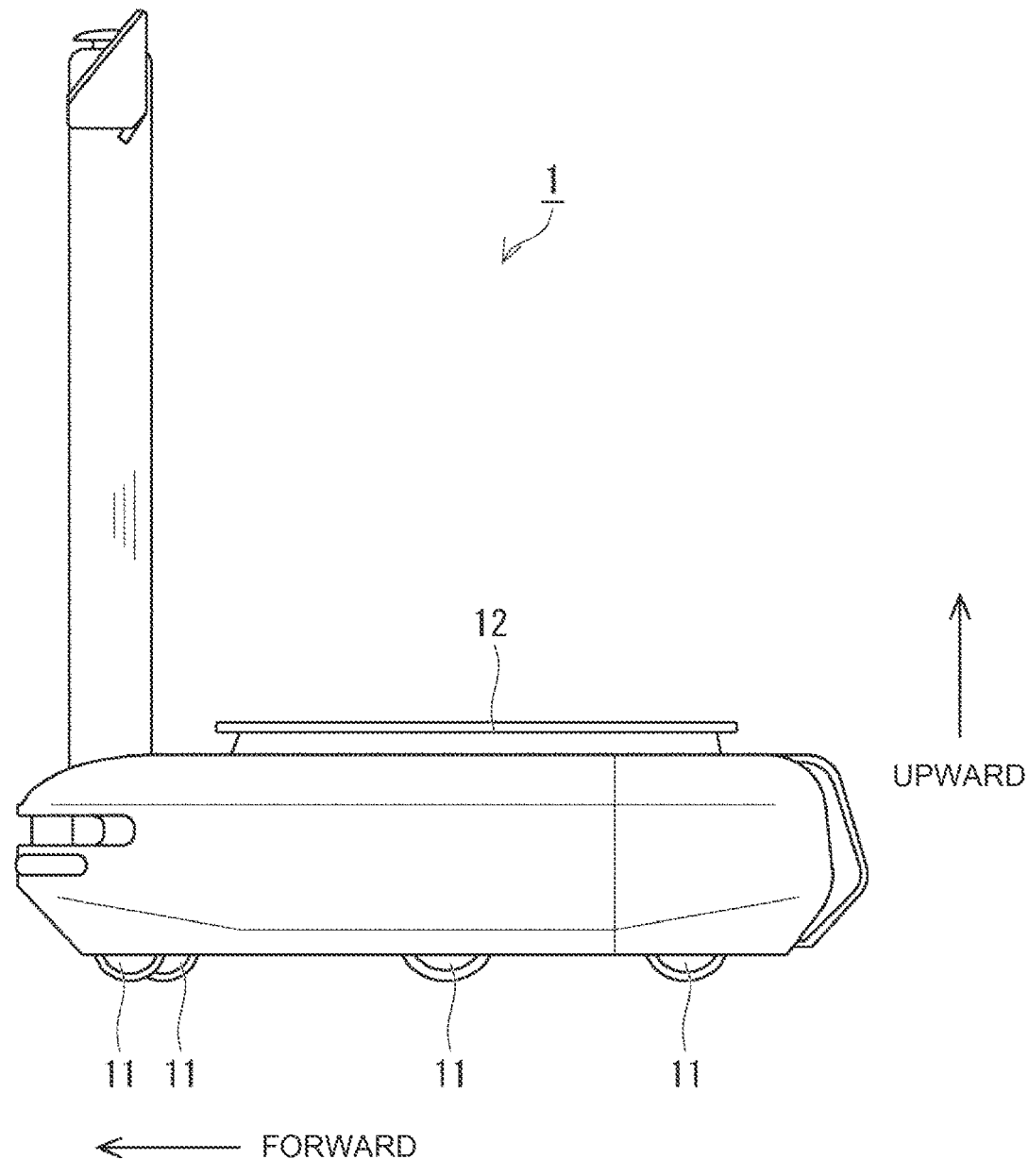
FIG. 2 is a side view of the mobile object according to the present embodiment.
Figure 3:
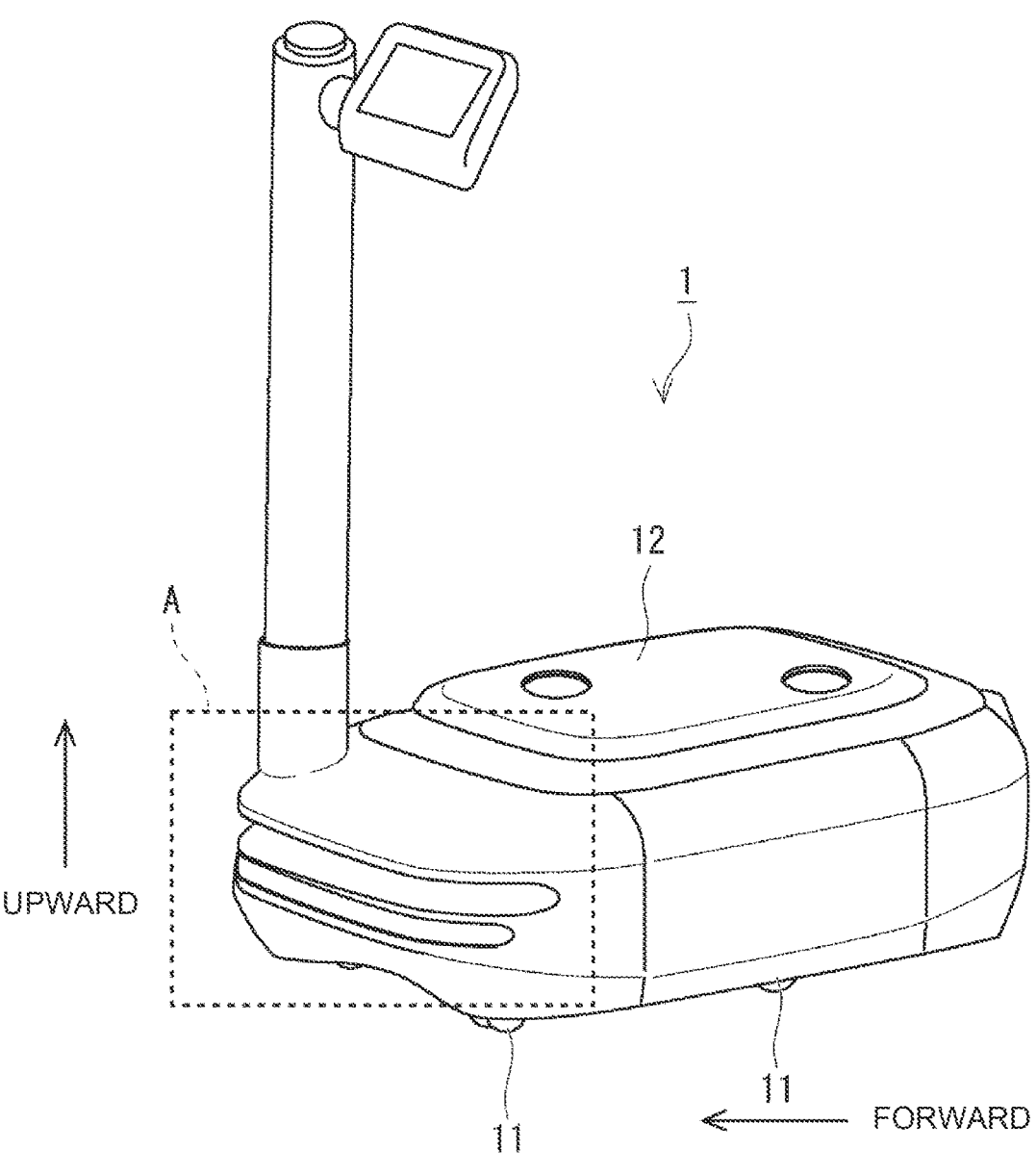
FIG. 3 is a perspective view of the mobile object according to the present embodiment.

Hereinafter, the present embodiment will be described with reference to the drawings. FIG. 1 is a block diagram showing a schematic system configuration of a mobile object according to the present embodiment. FIG. 2 is a side view of the mobile object according to the present embodiment. FIG. 3 is a perspective view of the mobile object according to the present embodiment.

A mobile object 1 according to the present embodiment is configured to move autonomously. The mobile object 1 is configured, for example, as a transport robot that places and transports a load or the like on a loading platform 12. The mobile object 1 according to the present embodiment includes, for example, a lifting and lowering unit 2, a control processing device 3, a sensor group 4, a wheel drive unit 5, a storage unit 6, a communication unit 7, and an exhaust heat fan device 8.

The control processing device 3 is an information processing device including an arithmetic unit such as a central processing unit (CPU) and a graphics processing unit (GPU), and the control processing device 3 acquires information from each configuration of the mobile object 1 via the communication unit 7, and sends instructions to each configuration. The control processing device 3 controls operation of the wheel drive unit 5 and the lifting and lowering unit 2.

The sensor group 4 is a general term for various sensors that the mobile object 1 includes. The sensor group 4 includes a distance sensor 41, a posture sensor, a rotary encoder, and the like. The distance sensor 41 includes an optical irradiation unit provided with an optical lens on a front surface. The distance sensor 41 irradiates light such as a laser onto an object such as a road surface or an obstacle via the optical lens and obtains distance information to the object based on a reflected light thereof. The sensor group 4 is connected to the control processing device 3 and supplies a detected signal to the control processing device 3.

The wheel drive unit 5 includes a motor 51 that drives a plurality of wheels 11, a motor driver 52 that drives the motor 51, and the like. The lifting and lowering unit 2 includes a lifting and lowering mechanism 21 that lifts and lowers the loading platform 12, a motor 22 that drives the lifting and lowering mechanism 21, a motor driver 23 that drives the motor 22, and the like. The wheel drive unit 5 and the lifting and lowering unit 2 are connected to the control processing device 3 and are driven in response to the instructions from the control processing device 3.

The storage unit 6 includes non-volatile memory and stores a floor map and an operating parameter. The floor map is a database necessary for the mobile object 1 to move autonomously and may include location information of an obstacle or a transport object.

The control processing device 3 controls movement of the mobile object 1 based on, for example, a moving route transmitted from a server and the like and the distance information of the obstacle detected by the distance sensor 41 of the sensor group 4.

The control processing device 3 controls the wheel drive unit 5 in order for the mobile object 1 to move along the moving route transmitted from a server and the like, while avoiding an obstacle, based on the distance information of the obstacle detected by the distance sensor 41. Thereby, the mobile object 1 can autonomously move from a set departure point to a destination while avoiding the obstacle. Note that the control processing device 3 may control the wheel drive unit 5 in order for the mobile object 1 to move autonomously based on information from another sensor.

In a mobile object, when foreign matter adheres to the optical lens of the irradiation unit of the distance sensor, there is a possibility that an obstacle and the like is erroneously detected, thereby causing a problem in autonomous movement.

In view of this, the mobile object 1 according to the present embodiment includes the exhaust heat fan device 8 for sending out air from the mobile object 1, and an exhaust flow path 9 through which the air sent out by the exhaust heat fan device 8 flows, and an irradiation unit 411 of the distance sensor 41 is disposed at an outlet where the air blows out from the exhaust flow path 9 (forward in a blowing out direction of the blown out air).

With this configuration, the air blown out from the exhaust flow path 9 can be blown onto a surface of an optical lens 412 of the irradiation unit 411 of the distance sensor 41. This can prevent the foreign matter from adhering to the optical lens 412 of the irradiation unit 411 of the distance sensor 41.

That is, in the mobile object 1 according to the present embodiment, as a starting point, the air inside the mobile object 1 is used for cleaning the distance sensor 41. The mobile object 1 not only has a function of lowering temperature inside the mobile object 1, but also has a function of cleaning the distance sensor 41 at the same time. This is aimed at killing two birds with one stone (improving efficiency). Furthermore, as described above, by using the exhaust heat fan device 8, there is no need to provide a new sending device for cleaning the distance sensor 41. Even when the new sending device is provided, output of the new sending device can be reduced, thereby resulting in electric power saving and cost reduction.

Figure 4:
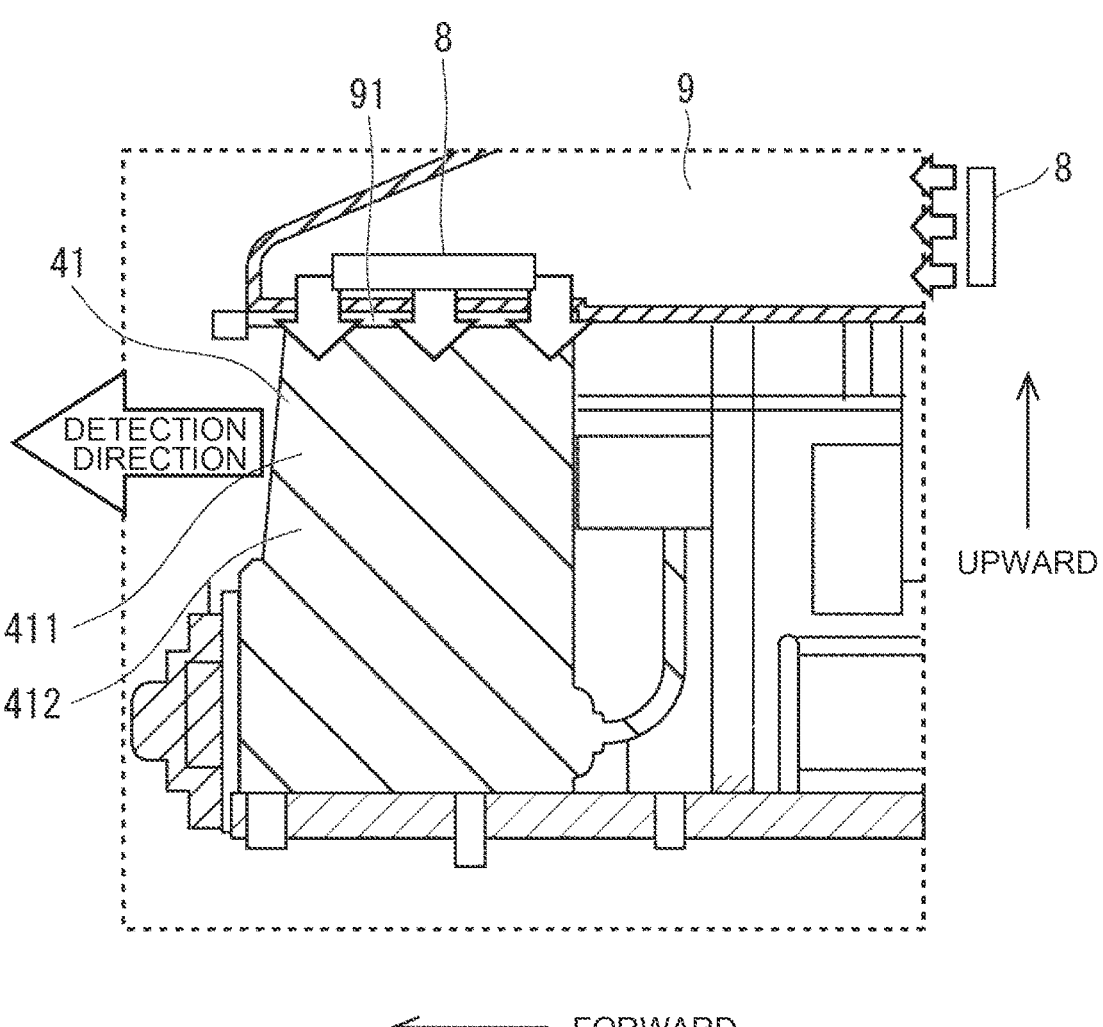
FIG. 4 is a sectional view of part A of the mobile object shown in FIG. 3.

FIG. 4 is a sectional view of part A of the mobile object 1 shown in FIG. 3. Inside a main body of the mobile object 1, for example, a heat generating source that generates heat such as a control board, a battery, and a motor is provided. The exhaust flow path 9 is formed between the heat generating source and an exhaust port 91. The exhaust heat fan device 8 is provided in at least one of the exhaust flow path 9 and the exhaust port 91. The exhaust heat fan device 8 includes, for example, a fan unit 81 that rotates, a motor 82 that rotates the fan unit 81, a motor driver 83 that drives the motor 82, and the like.

Air containing heat generated from the heat generating source is discharged to an outside as exhaust gas from the exhaust port 91 via the exhaust flow path 9 by the exhaust heat fan device 8. Note that temperature of the exhaust gas is assumed to decrease sufficiently during the process of flowing through the exhaust flow path 9. Further, the exhaust flow path 9 may be provided with a filter.

The exhaust gas is blown out from above toward the irradiation unit 411 of the distance sensor 41. That is, the exhaust port 91 is provided above the distance sensor 41 in a front side of the mobile object 1, as shown in FIG. 4. The irradiation unit 411 of the distance sensor 41 is disposed at the outlet of the exhaust port 91 of the exhaust flow path 9 (forward in a blowing out direction of the air blown out from the exhaust flow path 9). This can prevent foreign matter such as dust from adhering to the optical lens 412 of the irradiation unit 411 of the distance sensor 41 due to the air blown out from the exhaust port 91.

Figures 5, 6:
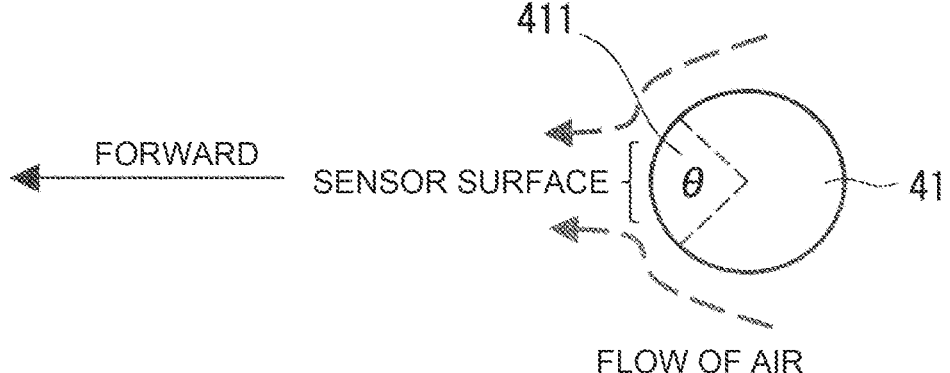
FIG. 5 is a diagram showing relationship between a detection direction of a distance sensor and a blowing out direction of air blowing out from an exhaust port.
FIG. 6 is a top view showing an air flow of the distance sensor.

FIG. 5 is a diagram schematically showing relationship between a detection direction of the distance sensor 41 and a blowing out direction of the air blowing out from the exhaust port 91. A method for preventing the foreign matter from adhering to the distance sensor 41 according to the present embodiment will be further described with reference to FIG. 5.

As shown in FIG. 5, the detection direction of the distance sensor 41 is the forward direction. In contrast, the blowing out direction of the air blowing out from the exhaust heat fan device 8 of the exhaust port 91 is the downward direction. Therefore, the blown air generates an air curtain on the surface of the optical lens 412 of the irradiation unit 411 of the distance sensor 41. The air curtain can prevent foreign matter such as dust from adhering to the optical lens 412 of the irradiation unit 411 of the distance sensor 41.

Furthermore, as shown in FIG. 6, the distance sensor 41 may include a curved surface portion on a sensor surface from which irradiation is performed by the irradiation unit 411. Note that, in FIG. 6, a range of the sensor surface is assumed to be θ. θ includes the detection direction and may be 360°.

An air flow path leading to the sensor surface of the irradiation unit 411 is connected to the curved surface portion. As a result, a flow of the air blown out from the exhaust port 91 of the exhaust flow path 9 follows along a curved surface of the curved surface portion due to the Coanda effect. Therefore, since air is more likely to hit the sensor surface of the irradiation unit 411, adhesion of foreign matter such as dust can be more effectively prevented.

Note that, as shown in FIG. 6, a shape of the sensor surface of the irradiation unit 411 is a circular sectional shape but is not limited to this, and, for example, may be formed in a partially curved shape so as to induce air to the sensor surface.

Figure 7:
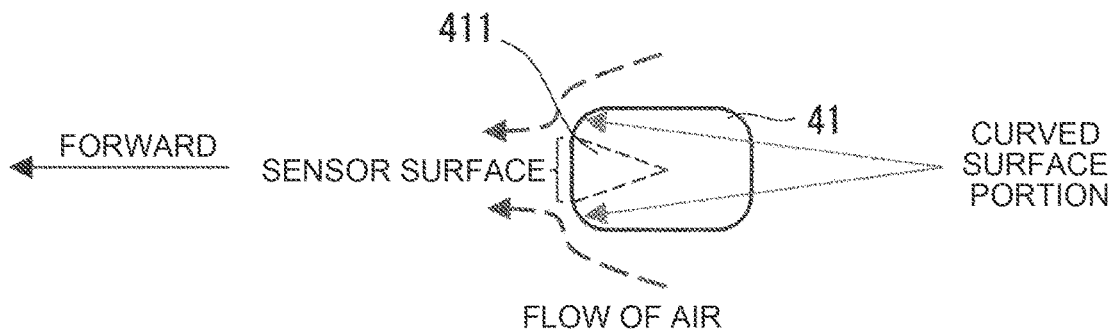
FIG. 7 is a top view showing an air flow of the distance sensor.

Further, as shown in FIG. 7, the sensor surface of the irradiation unit 411 may be flat without being curved. In this case, the curved surface portion may be provided at a portion constituting the flow path (including an outer surface of the distance sensor 41), and connecting to the sensor surface. As a result, the air is induced to the sensor surface as in a case where the sensor surface directly includes the curved surface portion. That is, separation of the air occurs on the sensor surface and a vortex is formed, thereby contributing to disturbance of the air and removal of dirt and dust.

Figure 8:
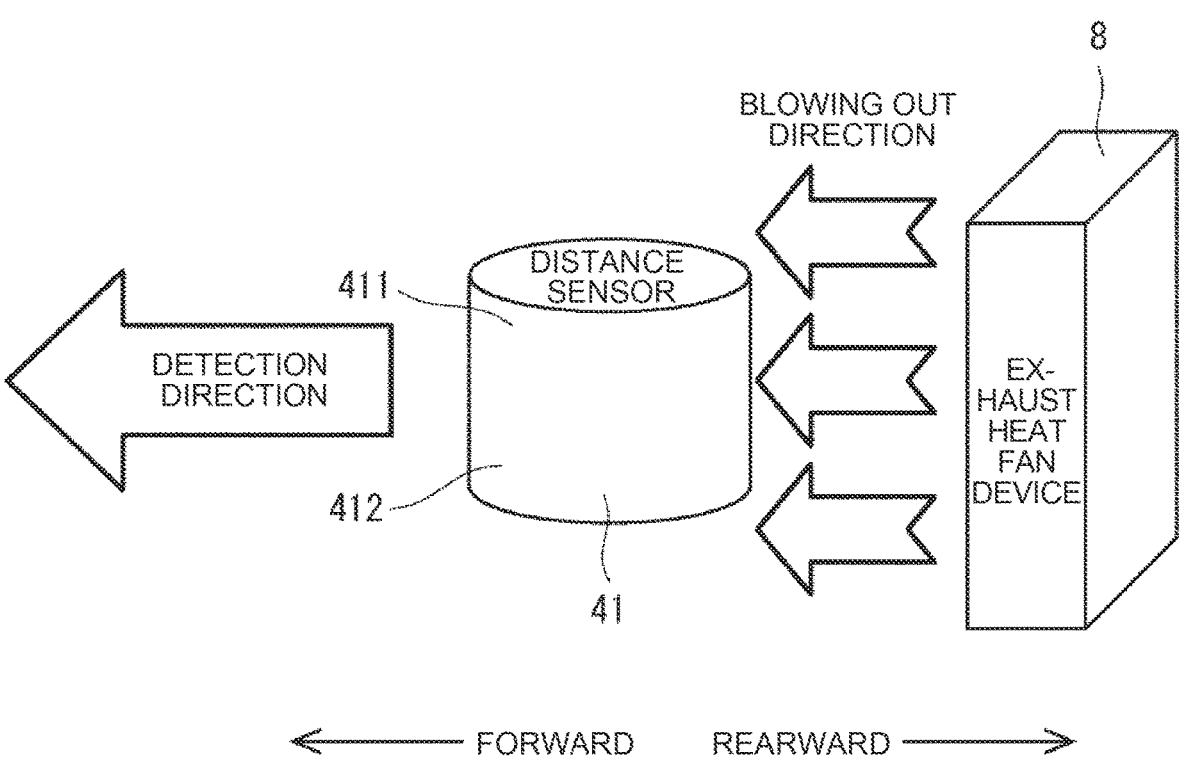
FIG. 8 is a diagram showing a state in which the air is blown out from behind toward an irradiation unit of the distance sensor.

Note that, as shown in FIG. 8, the air from the exhaust heat fan device 8 of the exhaust port 91 may be blown out from behind toward the irradiation unit 411 of the distance sensor 41. In this case, the exhaust heat fan device 8 of the exhaust port 91 may be provided behind the distance sensor 41, for example.

Further, the air from the exhaust heat fan device 8 of the exhaust port 91 may be blown out from a side toward the irradiation unit 411 of the distance sensor 41. In this case, the exhaust heat fan device 8 of the exhaust port 91 may be provided on the side of the distance sensor 41, for example.

The exhaust heat fan device 8 is connected to the control processing device 3 and is driven in response to the instruction from the control processing device 3. The control processing device 3 performs instruction to the exhaust heat fan device 8 to drive the exhaust heat fan device 8 while the mobile object 1 is moving.

As a result, when the mobile object 1 moves autonomously based on the distance information detected by the distance sensor 41, air can be always blown from the exhaust port 91 onto the surface of the optical lens 412 of the irradiation unit 411 of the distance sensor 41. Therefore, it is possible to more reliably prevent the foreign matter from adhering to the optical lens 412 of the irradiation unit 411 of the distance sensor 41, and to prevent erroneous detection of an obstacle and the like.

In the embodiment described above, the distance sensor 41 is disposed at the outlet where the air is blown out from the exhaust flow path 9 but is not limited to this. For example, a camera, a wide-area camera, a light-receiving sensor, and the like may be disposed at the outlet where the air is blown out from the exhaust flow path 9. This can prevent the foreign matter from adhering to these sensors. Note that when the sensor is the light-receiving sensor, the sensor surface is a surface that receives light.

In the embodiment described above, the mobile object 1 may be configured as a robot vacuum cleaner that autonomously moves and performs cleaning. The mobile object 1 is provided with a suction device. The air inside the mobile object 1 is discharged from the exhaust port via the exhaust flow path by suction force of the suction device. Note that the exhaust flow path may be provided with a filter.

For example, air is blown out from above toward the irradiation unit of the distance sensor, as described above. That is, the exhaust port is provided above the distance sensor in the front side of the mobile object. The irradiation unit of the distance sensor is disposed at the outlet of the exhaust port of the exhaust flow path. This can prevent foreign matter such as dust from adhering to the optical lens of the irradiation unit of the distance sensor due to the air blown out from the exhaust port.

While several embodiments of the present disclosure have been described, these embodiments have been presented by way of example and are not intended to limit the scope of the present disclosure. These novel embodiments can be embodied in various other modes, and various omissions, replacements, and modifications can be made without departing from the scope of the present disclosure. These embodiments and modifications thereof are included in the scope and gist of the present disclosure, and are included in the scope of the present disclosure described in the claims and equivalents thereof.

What is claimed is:

1. A mobile object configured to move autonomously, the mobile object comprising:
   a sending out unit configured to send out air within the mobile object;
   a flow path configured to allow the air sent out by the sending out unit to flow; and
   a sensor configured to detect information around the mobile object and disposed forward in a blowing out direction of the air blown out from the flow path, wherein the sensor includes a curved surface portion on a sensor surface or on a portion connected to the sensor surface, and the flow path is connected to the curved surface portion.

2. The mobile object according to claim 1, wherein the sending out unit is an exhaust heat fan device configured to send out air including exhaust heat from the mobile object.

3. The mobile object according to claim 1, wherein
   the mobile object is a robot vacuum cleaner configured to autonomously move and perform cleaning; and
   the sending out unit is a suction device configured to perform the cleaning.

4. The mobile object according to claim 1, wherein the air is blown out from above in a vertical direction of the mobile object, from behind in a longitudinal direction of the mobile object, or from a side in the longitudinal direction of the mobile object, with respect to the sensor.

5. A method for preventing foreign matter from adhering to a mobile object, the mobile object including a sensor with a curved surface portion on a sensor surface or on a portion connected to the sensor surface, the sensor configured to detect information around the mobile object, a sending out unit configured to send out air within the mobile object, and a flow path configured to allow the air sent out by the sending out unit to flow, the flow path being connected to the curved surface portion, and the mobile object being configured to move autonomously based on distance information detected by the sensor, the method comprising blowing the air onto the sensor from an outlet of the flow path.

* * * * *